(12) United States Patent
Schoneborn et al.

(10) Patent No.: US 11,452,989 B2
(45) Date of Patent: Sep. 27, 2022

(54) COATED COMPOSITES OF $AL_2O_3$—$CEO_2$/$ZRO_2$ AND A METHOD FOR THEIR PRODUCTION

(71) Applicant: Sasol Germany GmbH, Hamburg (DE)

(72) Inventors: Marcos Schoneborn, Hamburg (DE); Noelia Guillen-Hurtado, Alicante (ES); Thomas Harnening, Munster (DE); Dirk Niemeyer, Brunsbuttel (DE); Diane Howe, St. Michalisdonn (DE)

(73) Assignee: Sasol Germany GmbH, Hamburg (DE)

( * ) Notice: Subject to any disclaimer, the term of this patent is extended or adjusted under 35 U.S.C. 154(b) by 1217 days.

(21) Appl. No.: 15/521,073

(22) PCT Filed: Nov. 9, 2015

(86) PCT No.: PCT/EP2015/002238
§ 371 (c)(1),
(2) Date: Apr. 21, 2017

(87) PCT Pub. No.: WO2016/131466
PCT Pub. Date: Aug. 25, 2016

(65) Prior Publication Data
US 2017/0354954 A1   Dec. 14, 2017

(30) Foreign Application Priority Data
Feb. 17, 2015   (EP) .................................. 15155488

(51) Int. Cl.
*B01J 23/00*       (2006.01)
*B01J 35/10*       (2006.01)
(Continued)

(52) U.S. Cl.
CPC ............. *B01J 23/002* (2013.01); *B01J 21/04* (2013.01); *B01J 23/10* (2013.01); *B01J 35/002* (2013.01);
(Continued)

(58) Field of Classification Search
CPC .. B01J 23/002; B01J 35/1023; B01J 35/1014; B01J 35/1038; B01J 35/1019;
(Continued)

(56) References Cited

U.S. PATENT DOCUMENTS

2010/0126154 A1   5/2010   Klingmann et al.
2013/0023410 A1*  1/2013   Schoneborn ............. B01J 21/04
                                                        502/439
2013/0336864 A1   12/2013  Zheng et al.

FOREIGN PATENT DOCUMENTS

CN   102039146    5/2011
JP   2006181487   7/2006
(Continued)

OTHER PUBLICATIONS

Tettenhorst, R., Hofmann, D.A. "Crystal Chemistry of Boehmite" Clays Clay Miner. 28, 373-380 (1980). https://doi.org/10.1346/CCMN.1980.0280507 (Year: 1980).*
(Continued)

*Primary Examiner* — Colin W. Slifka
(74) *Attorney, Agent, or Firm* — Bushman Werner, P.C.

(57) ABSTRACT

The present invention relates to a metal oxide coated composite comprising a core consisting of a mixture of a La stabilised $Al_2O_3$ phase and an $Ce/Zr/RE_2O_3$ mixed oxide phase, the core having a specific crystallinity, specific pore volume and a specific pore size distribution, and a method for the production of the metal oxide coated composite.

10 Claims, 4 Drawing Sheets

(51) Int. Cl.
| | |
|---|---|
| *F01N 3/28* | (2006.01) |
| *B01J 23/10* | (2006.01) |
| *B01J 37/00* | (2006.01) |
| *B01J 37/02* | (2006.01) |
| *B01J 35/00* | (2006.01) |
| *C04B 41/50* | (2006.01) |
| *B01J 37/03* | (2006.01) |
| *C04B 41/00* | (2006.01) |
| *C04B 41/87* | (2006.01) |
| *F01N 13/16* | (2010.01) |
| *B01J 21/04* | (2006.01) |
| *F01N 3/10* | (2006.01) |
| *C04B 111/00* | (2006.01) |

(52) U.S. Cl.
CPC ....... *B01J 35/1014* (2013.01); *B01J 35/1019* (2013.01); *B01J 35/1023* (2013.01); *B01J 35/1038* (2013.01); *B01J 35/1042* (2013.01); *B01J 35/1061* (2013.01); *B01J 35/1085* (2013.01); *B01J 37/0045* (2013.01); *B01J 37/0201* (2013.01); *B01J 37/0203* (2013.01); *B01J 37/0236* (2013.01); *B01J 37/035* (2013.01); *C04B 41/009* (2013.01); *C04B 41/5045* (2013.01); *C04B 41/87* (2013.01); *F01N 3/2828* (2013.01); *F01N 13/16* (2013.01); *B01J 35/008* (2013.01); *B01J 2523/00* (2013.01); *B01J 2523/3712* (2013.01); *B01J 2523/48* (2013.01); *B01J 2523/74* (2013.01); *C04B 2111/0081* (2013.01); *C04B 2235/3217* (2013.01); *C04B 2235/3224* (2013.01); *C04B 2235/44* (2013.01); *F01N 3/101* (2013.01); *F01N 2510/063* (2013.01); *Y02T 10/12* (2013.01)

(58) Field of Classification Search
CPC .... B01J 35/1085; B01J 35/002; B01J 37/035; B01J 37/0236; B01J 37/0201; B01J 21/04; B01J 23/10; B01J 35/1042; B01J 37/0045; B01J 37/0203; B01J 35/1061; B01J 35/008; B01J 2523/00; B01J 2523/3712; B01J 2523/48; B01J 2523/74; B01J 21/06; B01J 32/00; C04B 41/5045; C04B 41/009; C04B 41/87; C04B 2235/44; C04B 2111/0081; C04B 2235/3217; C04B 2235/3224; F01N 13/16; F01N 3/2828; F01N 3/101; F01N 2510/063; Y02T 10/12
USPC ...................................................... 502/304
See application file for complete search history.

(56) References Cited

FOREIGN PATENT DOCUMENTS

| | | |
|---|---|---|
| JP | 2006263581 | 10/2006 |
| WO | WO2012/088373 | 6/2012 |
| WO | WO2013/007242 | 1/2013 |
| WO | WO2013/007809 | 1/2013 |
| WO | WO-2013007242 A1 * | 1/2013 .............. B01J 23/63 |

OTHER PUBLICATIONS

Machine translation of IDS reference JP 2006/0181487 (Year: 2006).*

Baker, et al., Water Content of Pseudoboehmite: A new model for its structure, Journal of Catalysis, vol. 33, issue 2, p. 265-278, 1974.

* cited by examiner

COATED COMPOSITES OF AL$_2$O$_3$—CEO$_2$/ZRO$_2$ AND A METHOD FOR THEIR PRODUCTION

FIELD OF THE INVENTION

The present invention refers to coated composites based on ceria (oxide of cerium), zirconia (oxide of zirconium) and alumina (oxide of aluminium), hereinafter referred to in abbreviated form as Al/Ce/Zr composites and a method for their production.

BACKGROUND OF THE INVENTION

Al/Ce/Zr composites comprising catalytically active noble metals are commonly employed in the flue gas treatment of automobiles. However, there exists a current need within the emission control framework for the development of thermally more stable and more homogenous Al/Ce/Zr composites.

WO2013/007809 A1 describes a method for the preparation of a calcined mixed oxide comprising Al/Ce/Zr composites with a high thermal stability. This advantage is achieved by the combination of a homogenously precipitated Ce/Zr-hydroxide wetcake with a suspension of boehmite. WO2013/007242 A1 also discloses a method of producing Al/Ce/Zr composites having an increased thermal stability. According to WO2013/007242 A1 an aqueous alkaline boehmite suspension is used and the precipitation is performed in the suspension in the presence of soluble metal salts forming a Ce/Zr hydroxide precipitate which is homogenously distributed in the boehmite matrix. For both these references, the thermal stability is achieved as the Al/Ce/Zr composite consists of two phases, a La-stabilised Al$_2$O$_3$ phase and a Ce/Zr/RE (RE=rare earth metals) phase, both phases being homogenously distributed next to each other resulting in special porosity properties. The composite preferably contains 20% to 80% by weight aluminum, 5% to 80% by weight zirconium, 5% to 80% by weight cerium and optionally 0% to 12% by weight of rare earth metals, calculated as Al$_2$O$_3$, ZrO$_2$, CeO$_2$, and RE$_2$O$_3$ respectively.

However, if in a noble metal-containing, in particular Rh-containing, three-way-catalyst, the noble metal is supported on a state of the art Al/Ce/Zr composite as described above, the direct contact between Rhodium and Al$_2$O$_3$, which is very likely in such a catalyst, results in a catalyst deactivation by way of a reaction forming rhodium-aluminate at high temperatures under lean-conditions.

Therefore to make Al/Ce/Zr composites applicable in Rh-containing noble-metal catalyst formulations, direct metal-alumina contact has to be avoided.

To avoid a noble metal—Al$_2$O$_3$ contact WO2012/088373 A2 suggests applying a coating to the Al/Ce/Zr composite. WO2012/088373 A2 in more detail teaches a catalyst comprising an Al/Ce/Zr core powder having a solid solution coated on the core powder, the coating having the formula x$_2$(Ce$_{1-w}$Zr$_w$):y$_2$M wherein x$_2$=x-x$_1$ and y$_2$=y-y$_1$ and in which 0≤x$_1$/x<1 and 0≤y$_1$/y<1. The core powder is a pseudoboehmite as amongst others illustrated in FIG. 2 of WO2012/088373. The coating may be applied onto the catalyst support core powders using a solution of metal acetates or nitrates with the metal being cerium, zirconium, alkaline earth elements, transition metal elements and other rare earth elements. An example of a Cerium/Zirconium/Metal coating is illustrated in FIG. 1a of WO2012/088373 A2. However, by this method no uniform coating is obtained on the Al/Ce/Zr composite and contact between any of the noble metals and Al$_2$O$_3$ deactivating the catalyst is not sufficiently prohibited.

The object of the present invention is therefore to provide an improved coating for an Al/Ce/Zr composite having high thermal stability. The inventors of the present application have surprisingly found a novel composite and a novel method of making such a composite.

SUMMARY OF INVENTION

The invention is described in the independent claims. Preferred embodiments are subject of the dependent claims of described herein below.

According to the first aspect of the invention, there is provided a coated Al/Ce/Zr composite comprising:

a calcined Al/Ce/Zr core, the core consisting of two phases, a La stabilised Al$_2$O$_3$ phase and a Ce/Zr/RE$_2$O$_3$ mixed oxide phase, both phases forming a homogeneous mixture, the core being characterised by a reflection at 2θ=67°+/−2°, preferably +/1° (each in short 2θ≈67°), of gamma alumina and a reflection at 2θ=29°+/−2°, preferably +/1° (each in short 2θ≈29°), of Ce/Zr solid solution, and having a pore volume of above 0.2 ml/g, (according to DIN 66133) and a pore radius distribution having a maximum between 50 and 200 Å (according to DIN 66133), the core comprising a metal oxide coating such that the metal oxide coating forms 1 to 50 wt. % of the coated Al/Ce/Zr composite.

Calcination of the Al/Ce/Zr core takes place at 400° C. to 900° C., preferably at 500° C. to 700° C., typically at 600° C.

The Al/Ce/Zr core comprises aluminum from 20 to 80% by weight on aluminum oxide basis, preferably between 40 and 70% by weight on aluminum oxide basis.

The non-calcined alumina precursor forming part of the Al/Ce/Zr core consists of boehmite. A boehmite according to the present invention is a compound of formula AlOOH*xH$_2$O (0≤x≤1). To be noted is that poorly crystallized pseudoboehmite is not included in the definition of boehmite according to the present invention. This is such as the alumina precursor of the present invention has a higher degree of crystallinity compared to pseudoboehmite. This is reflected in more narrow X-ray diffraction lines. Furthermore, the unit cell of the boehmite according to the present invention has a smaller crystallographic b-axis as the (020) reflection is shifted to higher diffraction angles with d-values below 6.5 Å and typically from 6.05 Å to 6.20 Å such as 6.11 Å versus 6.6-6.7 Å in pseudoboehmite. This is due to the loss of crystal water during the crystallite growth process. The alumina precursor of the present invention therefore has a crystallinity reflected in a narrow (020) reflection and a short crystallographic b-axis indicated by the d-value of the (020) reflection between 6.1 Å and less than 6.5 Å. This value can be measured as per Baker et el, Journal of Catalysis 33,265-278 (1974). A preferred non-calcined boehmite has a crystallite size of 4 to 40 nm, preferably 4 to 16 nm, measured at the (020) reflection.

In a preferred embodiment of the invention, when calcined, the alumina precursor transforms into a gamma-alumina and most preferably forms a gamma-alumina with a significant reflection of gamma-alumina between 2θ=65° and 2θ=69° preferably between 2θ=66° and 2θ=68°. The calcined Al/Ce/Zr core has a pore volume of 0.4 to 1.2 ml/g. Further, the ratio between the intensity (area under the peak till the base line) of the reflection of gamma-alumina phase (γ-Al2O3) at 2θ equals 67°+/−2°, preferably +/−1°, and the intensity (area under the peak till the base line) of the reflection of Ce/Zr solid solution (CZ) at 2θ equals 2θ°+/−2°, preferably +/−1°, normalized by the Al$_2$O$_3$ weight of the calcined Al/Ce/Zr core, is larger than 1 for the calcined Al/Ce/Zr core according to the present invention.

The ratio may be given as $$I_{\gamma\text{-}Al2O3}/I_{CZ}$$

while the normalized ratio is $$(I_{\gamma\text{-}Al2O3}/I_{CZ}) \cdot (100 \text{ Wt \%}/(_{wt.~\%} Al_2O_3))$$

To be noted is that the type of alumina precursor utilized for the production of the core is boehmite and the crystallite size and d-value of such an alumina precursor is preferably as described hereinbefore and essential to ensure that the Al/Ce/Zr core is coated as per the present invention.

The metal oxide coating may comprise an oxide or mixed oxide from the group of alkaline earth elements, transition metals and preferably rare earth metals.

More particularly, the metal oxide coating may comprise CeO$_2$, ZrO$_2$, or mixed oxides of Ceria/Zirconia, and a rare earth metal oxide different from Ceria. For example, the metal oxide coating may comprise mixed oxides of Ceria and rare earth metals, or mixed oxides of Zirconia and rare earth metals, or mixed oxides of Ceria, Zirconia and rare earth metals. Preferably the coating is CeO$_2$.

The pore volume of the calcined Al/Ce/Zr core is preferably between 0.2 to 1.0 ml/g, more preferably between 0.3 and 0.8 ml/g, and most preferably between 0.4 to 0.6 ml/g.

Regarding the pore size distribution of the calcined Al/Ce/Zr core, the maximum of the pore radius distribution curve, measured by Hg-intrusion porosimetry (according to DIN 66133), comprises a maximum that is preferably between 70 to 150 Å, most preferably between 80 to 130 Å. When it is referred to pore size or pore size distribution the pore radius is meant throughout this application.

The pore volume is related to the alumina content in that it increases with increasing alumina content. The position of the maximum of the pore radius distribution curve that is obtained via mercury intrusion porosimetry measurement is, however, less sensitive to the alumina content and located within the mesopore region. This relationship is emphasized in the general description of the patent application, particularly in FIG. 2.

The higher the percentage of the coating is in relation to the Al/Ce/Zr composite, the better the leaching suppression. The coating preferably forms between 4 to 27 wt. % of the coated Al/Ce/Zr composite.

According to a further aspect of the invention there is provided a method of producing a coated Al/Ce/Zr composite, the method comprising the steps of:
  i) preparing an Al/Ce/Zr core, the core being characterized by an alumina precursor of boehmite crystal structure having a crystallite size measured at the (020) reflection between 4 and 40 nm, the core consisting of two phases an La-stabilised Al$_2$O$_3$ phase and an Ce/Zr/RE$_2$O$_3$ mixed oxide phase, both phases forming a homogeneous mixture;
  ii) calcining the Al/Ce/Zr core to form a calcined Al/Ce/Zr core; the calcined core being further characterised by having a pore volume above 0.2 ml/g, and a maximum of the pore size distribution between 50 and 200 Å;
  iii) impregnating the calcined Al/Ce/Zr core with a metal oxide precursor such that the metal oxide forms a coating around the core, the metal oxide forming between 1 wt. % to 50 wt. % of the coated Al/Ce/Zr composite such that a coating is applied to the core; and
  iv) calcining the impregnated core to form the coated Al/Ce/Zr composite.

The Al/Ce/Zr core comprises aluminum from 20 to 80% by weight on an aluminum oxide (Al$_2$O$_3$) basis, preferably between 40 and 70% by weight on an aluminum oxide (Al$_2$O$_3$) basis, relative to all metal oxides used in the composition (and calculated as metal oxides, oxidation states as would be reached after calcination at 900° C. in a normal atmosphere).

The non-calcined alumina precursor forming part of the Al/Ce/Zr core material consists of boehmite as defined hereinbefore.

A preferred non-calcined boehmite has a crystallite size of 4 to 40 nm, preferably 4 to 16 nm, measured at the (020) reflection.

When calcined, after step ii) of the method of the invention, the core has a significant reflection of gamma-alumina between 2θ=65° and 2θ=69°, preferably 2θ=66° and 2θ=68°. The calcined Al/Ce/Zr core has a pore volume of 0.4 to 1.2 ml/g. Further, the ratio between the normalized $I_{\gamma\text{-}Al2O3}/I_{CZ}$ ratio is larger than 1 for the Al/Ce/Zr cores as already described herein.

To be noted is that the type of alumina precursor utilized for the core and the crystallite size of such an alumina precursor is essential to ensure that the Al/Ce/Zr core is coated as per the present invention.

The metal oxide precursor comprises precursors for the oxides of alkaline earth elements, transition metals or preferably rare earth metals. In particular the metal oxide precursor comprises precursors of CeO$_2$, ZrO$_2$, mixed oxides of Ceria/Zirconia, and rare earth metal oxides different from Ceria. For example, the metal oxide precursor may comprise mixed oxides of Ceria and one or more rare earth metals, or mixed oxides of Zirconia and one or more rare earth metals, or mixed oxides of Ceria, Zirconia and rare earth metals. A preferred metal oxide precursor comprises precursors for CeO$_2$.

CeO$_2$ precursors may comprise any Ce complex form. In particular, the CeO$_2$ precursors comprise Ce-nitrate, (NH$_4$)$_2$Ce(NO$_3$)$_6$, Ce-acetate, Ce-carbonate, Ce-sulfate, Ce-hydroxide, Ce-oxalate, Ce-acetylacetonate, Ce-Citrate-complex, or Ce-EDTA-complex. The CeO$_2$ precursor is preferably Ce-nitrate or Ce-acetate.

ZrO$_2$ precursors comprise Zr-acetate, Zr-nitrate, Zr(OH)$_2$CO$_3$, Zr-hydroxide or Zr-alkoxides.

The precursors of the rare earth element oxides different from Ceria, of the oxides of the transition metals and of the alkaline earth element oxides comprise nitrate, carbonate, hydroxide, halide or acetate salts thereof.

The coated Al/Ce/Zr composite is a suitable carrier for noble metals and noble metal oxides, in each case in particular Rh, for use as a catalyst for example in the flue gas treatment of automobiles.

The Al/Ce/Zr core of the present invention may comprise aluminum oxide and cerium/zirconium mixed oxides in the form of a solid solution, wherein Al$_2$O$_3$ and Ce/Zr mixed oxides form a homogeneous mixture. The Al/Ce/Zr core may comprise between 20% to 80% by weight aluminum, preferably between 40% and 70% by weight aluminum, calculated as Al$_2$O$_3$, between 5% to 80% by weight zirconium, calculated as ZrO$_2$, between 5 to 80% by weight cerium, calculated as CeO$_2$, and between 0% to 12% other rare earth metals.

According to another aspect of the invention, there is provided a coated Al/Ce/Zr composite produced according to the method of the present invention.

The inventors of the present invention have found that by applying a suitable metal oxide surface layer to a specific Al/Ce/Zr core material having a specific alumina precursor having a specific crystallite size, specific porosity and a specific pore size distribution, as defined above, that the effectiveness of the catalyst prepared therefrom can be significantly enhanced compared to the prior art.

This new coated composite presents the advantage of having a highly effective metal oxide surface layer preventing undesired direct noble-metal alumina contact, by impeding the accessibility of the La-stabilized $Al_2O_3$ phase within the Al/Ce/Zr composite.

This has been achieved by effectively covering the internal surface of a mesoporous Al/Ce/Zr composite material with a suitable metal oxide layer. The internal surface of the Al/Ce/Zr composite material particularly means the pore walls of the mesoporous material that can be filled by a liquid impregnation solution (e.g. the metal oxide precursor containing solution). A suitable metal oxide layer is formed by a metal oxide or mixed oxide that is stable against the reaction with noble metals in particular Rh and noble metal oxides, respectively to form less active phases leading to catalyst deactivation. Furthermore, the use of the Al/Ce/Zr core material having the specific alumina precursor, the specific crystallite size, porosity and pore size distribution as described herein enhances the thermal stability of the inventive coated Al/Ce/Zr composite compared to the prior art, as it can be shown in Table VII.

The present invention differs from the prior art in that it selects a specific Al/Ce/Zr core having specific crystalline properties characterized by a specific crystallite size, a specific normalized $I_{\gamma-Al2O3}/I_{CZ}$ ratio, a specific pore volume and a specific pore size distribution and includes a homogenous coating which forms a specific percentage of the coated composite to obtain the required advantages. The process of the present invention further differs from the prior art in that boehmite is used as a precursor. The formation of the uniform, effective coating is shown by the La-leaching suppression included hereunder.

As the lanthanum is a part of the La-stabilized alumina phase of the Al/Ce/Zr core as described above, its dissolution by an attack of an aqueous acid solution also reflects the accessibility of $Al_2O_3$ at the internal surface and therewith the probability of the formation of undesired direct noble metal alumina contacts in a final catalyst. An effective surface layer formation of a suitable metal oxide on the internal surface of the Al/Ce/Zr composite leads to a reduced accessibility of the La-stabilized alumina phase at the internal surface resulting in a lanthanum leaching suppression. The value of the lanthanum leaching suppression therefore directly reflects the effectiveness of the metal oxide surface layer to achieve to the required advantage. This will be illustrated by the Examples of the present invention.

DETAILED DESCRIPTION OF THE INVENTION

The elements of the invention will be further described hereunder:

Core material—Al/Ce/Zr Content and Crystallite Size

As per WO2013/007242 A1 (incorporated herein by reference), the Al/Ce/Zr core may comprise aluminum oxide and cerium/zirconium mixed oxides in the form of a solid solution, wherein $Al_2O_3$ and Ce/Zr mixed oxides form a homogeneous mixture. The Al/Ce/Zr core may comprise between 20% to 80% by weight aluminum, preferably between 40% and 70% by weight aluminum, calculated as $Al_2O_3$, between 5% to 80% by weight zirconium, calculated as $ZrO_2$, between 5 to 80% by weight cerium, calculated as $CeO_2$, and between 0% to 12% rare earth metals.

As per WO2013/007809 A1 (incorporated herein by reference), the Al/Ce/Zr core may comprise between 20% to 80% by weight aluminum, calculated as $Al_2O_3$, between 5% to 80% by weight zirconium, calculated as $ZrO_2$, between 5% to 90% by weight cerium, calculated as $CeO_2$, and optionally between 0% to 12% other rare earth metals.

A non-calcined alumina precursor forming part of the Al/Ce/Zr core consists of boehmite. A boehmite according to the present invention is a compound of formula $AlOOH*xH_2O$ ($0 \leq x \leq 1$). To be noted is that poorly crystallized Pseudoboehmite is not included in the definition of boehmite according to the present invention. This is such as the alumina precursor of the present invention has a higher degree of crystallinity reflected in more narrow X-ray diffraction lines. Furthermore, the unit cell of the boehmite according to the present invention has a smaller crystallographic b-axis as the (020) reflection is shifted to higher diffraction angles with d-values from about 6.15 Å versus 6.6-6.7 Å in Pseudoboehmite. This is due to the loss of crystal water during the crystallite growth process. The alumina precursor of the present invention therefore has a crystallinity reflected in a narrow (020) reflection and a short crystallographic b-axis indicated by the d-value of the (020) reflection between 6.1 Å and less than 6.5 Å. This value can be measured as per Baker et al., Journal of Catalysis 33,265-278 (1974). A preferred non-calcined boehmite has a crystallite size of 4 to 40 nm, preferably 4 to 16 nm, measured at the (020) reflection.

A preferred non-calcined boehmite has a crystallite size of 4 to 40 nm, preferably 4 to 16 nm, measured at the (020) reflection.

When calcined, after step ii) of the method of the invention, the core has a significant reflection of gamma-alumina between $2\theta=66°$ and $2\theta=68°$. The calcined alumina has a pore volume of 0.4 to 1.2 ml/g. Further, the ratio between the intensity of the reflection of gamma-alumina at $2\theta=67°$ and the intensity of the reflection of Ce/Zr solid solution at $2\theta \approx 29°$, normalized by the $Al_2O_3$ weight of the Al/Ce/Zr core, that can be taken as a crystallinity indication of the calcined Al/Ce/Zr core, being this normalized $I_{\gamma-Al2O3}/I_{CZ}$ ratio larger than 1 for the Al/Ce/Zr cores provided for in this patent. The calcination temperatures are known to those skilled in the art of the invention, preferably at a temperature of 400° C. to 900° C., in particular 500° C. to 850° C., for a time period exceeding 30 min.

To be noted is that the type of alumina precursor utilized for the core and the crystallite size of such an alumina precursor is essential to ensure that the Al/Ce/Zr core is coated as per the present invention.

Core Material—Pore Volume

The pore volume of the calcined Al/Ce/Zr core is preferably between 0.2 and 1.0 ml/g, more preferably between 0.3 ml/g and 0.7 ml/g, most preferably between 0.4 to 0.6 ml/g.

Core Material—Pore Size Distribution

The porosity of the appropriate calcined Al/Ce/Zr core material is characterized in that the pore size distribution shows a pronounced maximum in the mesopore range between 50 and 200 Å, more preferably between 70 and 150 Å, and most preferably between at 80 to 130 Å.

Correlation Between Pore Volume/Pore Size Distribution/Alumina Content

As shown per examples in FIG. 2, the pore volume of the calcined Al/Ce/Zr core material increases with an increase of the alumina content. The position of the maximum of the pore radius distribution curve is, however, less sensitive to the alumina content and shows a pronounced maximum for the Al/Ce/Zr core materials with alumina contents between 20% and 80% that is between 80 and 130 Å.

Metal Oxide

The metal oxide precursor comprises precursors for the oxides of alkaline earth elements, transition metals or preferably rare earth metals.

In particular the metal oxide precursors comprise precursors for $CeO_2$, $ZrO_2$, mixed oxides of Ceria/Zirconia, and rare earth metal oxides different from Ceria. For example, the metal oxide coating may comprise precursors for mixed oxides or Ceria and rare earth metals, or mixed oxides of Zirconia and rare earth metals, or mixed oxides of Ceria, Zirconia and rare earth metals.

$CeO_2$ precursors comprise Ce-nitrate, $(NH_4)_2Ce(NO_3)_6$, Ce-acetate, Ce-carbonate, Ce-sulfate, Ce-hydroxide, Ce-oxalate, Ce-acetylacetonate, Ce-Citrate-complex, or Ce-EDTA-complex. The $CeO_2$ precursor is preferably Ce-nitrate or Ce-acetate.

$ZrO_2$ precursors comprise Zr-acetate, Zr-nitrate, $Zr(OH)_2CO_3$, Zr-hydroxide or Zr-alkoxides. The precursors of the rare earth element oxides, different from ceria, oxides of the transition metals and alkaline earth element oxides, comprise nitrate, carbonate, hydroxide, halide or acetate salts.

Impregnation Techniques

Different types of impregnation techniques can be used to impregnate the calcined Al/Ce/Zr core with the metal oxide precursor. These comprise for example incipient wetness impregnation, equilibrium deposition filtration, or wetness impregnation.

The metal oxide precursor that is applied to the calcined Al/Ce/Zr core by one of these impregnation techniques is transformed to the metal oxide by a subsequent calcination step. The calcination steps are known to those skilled in the art of the invention, preferably at a temperature of 400° C. to 900° C., in particular 500° C. to 700° C., for a time period exceeding 30 min.

The invention will now be further described with reference to the following Figures and non-limiting examples.

In the Figures

Figure 1:
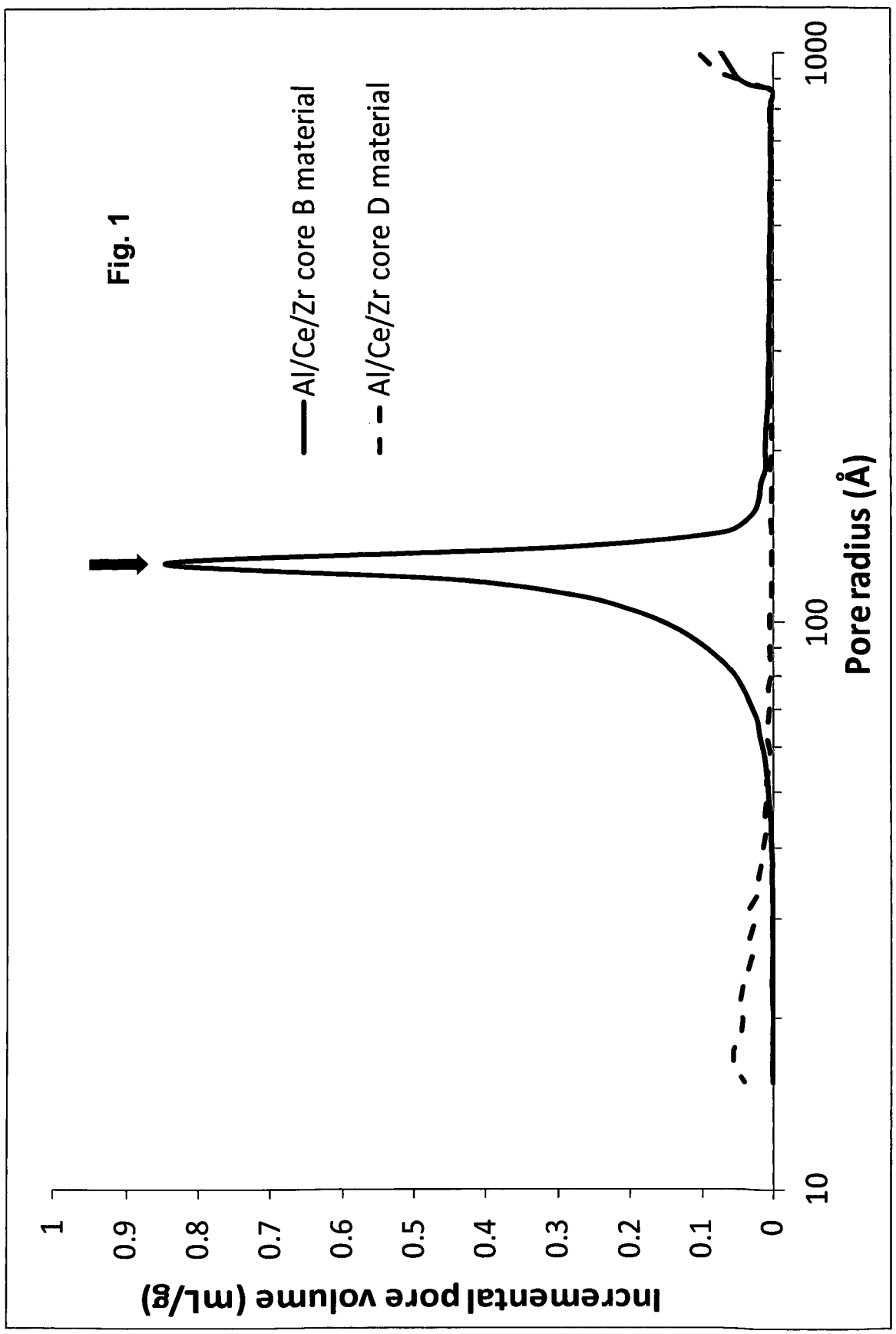
FIG. 1 represents the comparison of the pore radius distribution curves obtained by mercury intrusion porosimetry measurements of Al/Ce/Zr core B and Al/Ce/Zr core D materials.

In the figure it is indicated the gamma-alumina reflection at $2\theta \approx 67°$ and the Ce/Zr solid solution reflection at $2\theta \approx 29°$, the intensities of both reflections being used to calculate the normalized $I_{\gamma-Al2O3}/I_{CZ}$ ratio compiled in Table III.

EXPERIMENTAL

The test used for the La-leaching suppression is included hereunder:

La-Leaching Test: Experimental Details:

La-leaching test of the core materials of the present invention without metal oxide surface layer and the core materials of the present invention coated with a metal oxide or mixed metal oxide surface layer were performed by treating the powder in aqueous $HNO_3$ solution at pH=3. This mixture was stirred for 1 h at room temperature and then it was centrifuged and filtered. The filtered solution was analyzed by inductively coupled plasma optical emission spectroscopy (ICP-OES) to determine the lanthanum % that leaches from the sample (La-leaching %).

From the La-leaching (%) results it was calculated the La-leaching suppression (%) parameter that means how much the La-leaching % decreases after coating the calcined Al/Ce/Zr core surface with the metal oxide ($MO_x$). The formula used to carry out this calculation is the following:

$$\text{La-leaching suppression (\%)(hereunder given as a wt./wt. relationship)} = \frac{\text{(La-leaching (\%) of the Al/Ce/Zr core)} - \text{(La-leaching (\%) of the } x \text{ \% } MO_x/\text{Al/Ce/Zr core)}}{\text{(La-leaching (\%) of the Al/Ce/Zr core)}}$$

A higher value of the La-leaching suppression parameter therefore indicates a more effective metal oxide layer formation on the surface of the calcined Al/Ce/Zr core.

Preparation of Core Materials:

The preparations of the different Al/Ce/Zr core materials were performed according to prior art and are described in detail hereunder.

Al/Ce/Zr Core A Preparation:

The preparation of the Al/Ce/Zr composite core material was performed according to WO 2013/007809 A1.

Firstly, La-acetate solution was added to a Disperal® HP14 suspension (boehmite) with a $Al_2O_3$ content of 5 wt. % to obtain a 96% $Al_2O_3$:4% $La_2O_3$ weight ratio. This mixture was stirred for 30 minutes. Secondly, a Ce/Zr/Nd-hydroxides wetcake (composition: $CeO_2$=44 wt. %; $ZrO_2$=50 wt. %; $Nd_2O_3$=6 wt. %) was re-suspended in deionized water and then mixed with an external stirrer (Ultraturrax) for 5 minutes to obtain a suspension. This Ce/Zr/Nd-hydroxides suspension was added under stirring to the previous La-doped boehmite suspension at room temperature and then stirred for 30 minutes. The aqueous suspension obtained was spray dried. The powder obtained was calcined at 800° C. for 1 h to get the final calcined Al/Ce/Zr core material.

The composition of this Al/Ce/Zr core material checked by ICP was: $Al_2O_3$=46 wt. %; $La_2O_3$=2 wt. %; $CeO_2$=23 wt. %; $ZrO_2$=26 wt. %; $Nd_2O_3$=3 wt. %. The specific surface area is 83 $m^2/g$.

Al/Ce/Zr Core B Preparation:

This Al/Ce/Zr core material was prepared according to Example 4 of WO2013/007242 A1.

Firstly a boehmite suspension with $Al_2O_3$ content of 5 wt. % was prepared by stirring a commercially available Disperal® HP14/7 (boehmite modified with citric acid) with deionized water and then a solution of ammonia was added up to a pH of 10. This suspension was heated at 90° C. and a metal salts solution containing $(NH_4)_2Ce(NO_3)_6$, $ZrO(NO_3)_2$, $Nd(NO_3)_3$ and $La(NO_3)_3$ was added slowly to this suspension. After that ammonia solution was added to keep the pH at 9.0. This mixture was then stirred for 40 minutes at 90° C. Following that the mixture was filtered and the filter residue was washed with deionized water. The filter cake was re-suspended in deionized water using an external stirrer (Ultraturrax) for 10 minutes and then spray dried. The dry powder was calcined at 850° C. for 4 h to obtain the fresh calcined Al/Ce/Zr core material.

The composition of this Al/Ce/Zr core material checked by ICP was: $Al_2O_3$=75.6 wt. %; $La_2O_3$=2.5 wt. %; $CeO_2$=10.9 wt. %; $ZrO_2$=10.6 wt. %; $Nd_2O_3$=0.5 wt. %. The specific surface area is 119 m²/g.

Al/Ce/Zr Core C Preparations With Three Different $Al_2O_3$ Contents:

The preparation of the Al/Ce/Zr composite core C materials with varying alumina contents was performed according to the method described in WO 2013/007809 A1.

La-acetate solution was added to a Disperal® HP14 suspension (boehmite) with a $Al_2O_3$ content of 5 wt. % to obtain a 96% $Al_2O_3$:4% $La_2O_3$ weight ratio. This mixture was stirred for 30 minutes. On the other hand, a Ce/Zr/Nd-hydroxides wetcake (composition: $CeO_2$=28 wt. %; $ZrO_2$=66.4 wt. %; $Nd_2O_3$=5.6 wt. %) was re-suspended in deionized water and then mixed with an external stirrer (Ultraturrax) for 5 minutes to obtain a suspension. This Ce/Zr/Nd-hydroxides suspension was added under stirring to the previous La-doped boehmite suspension at room temperature and then stirred for 30 minutes. The aqueous suspension obtained was spray dried. The dry powder was calcined at 850° C. for 4 h to obtain the fresh Al/Ce/Zr core material.

Figure 2:
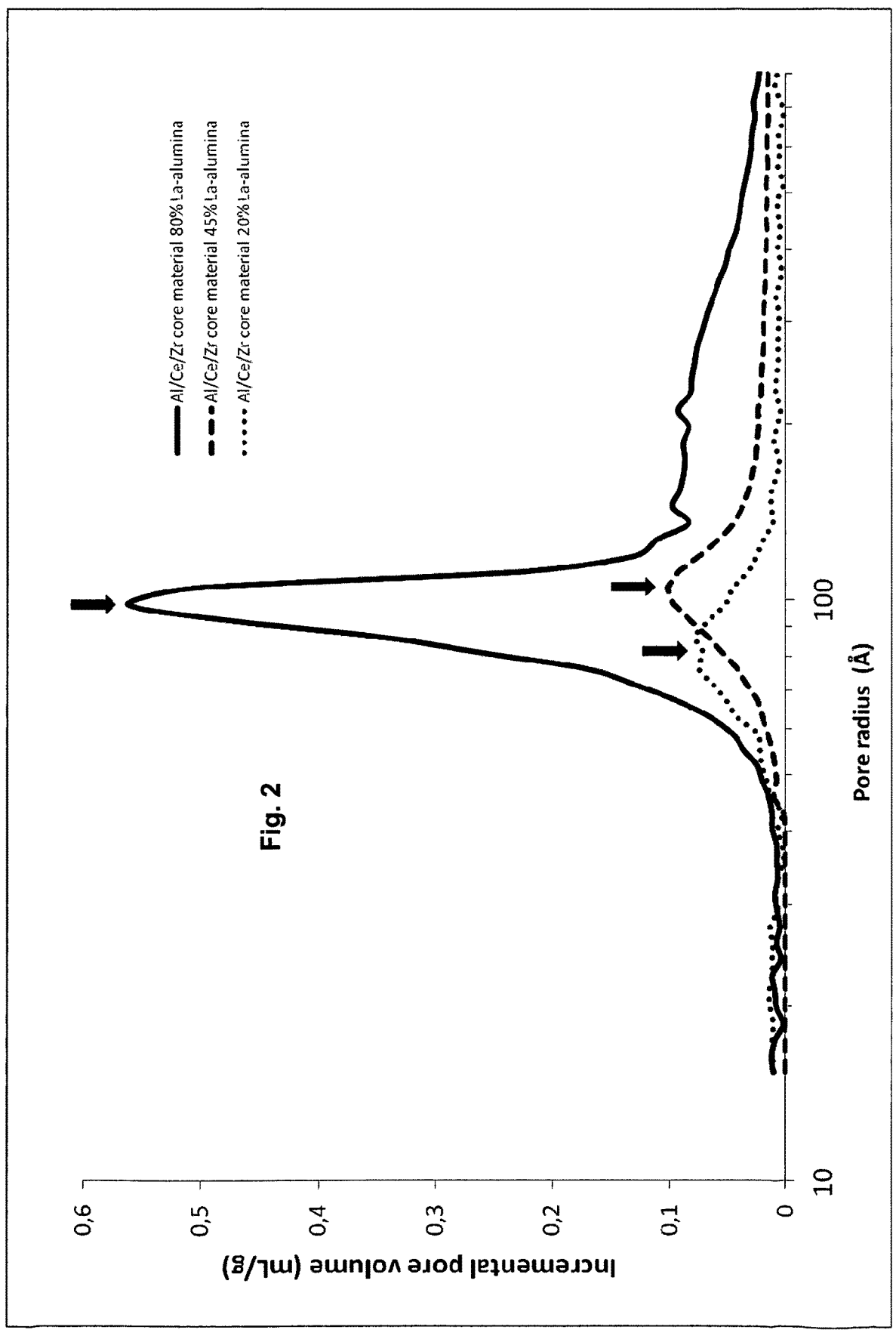
FIG. 2 represents the pore radius distribution curves obtained by mercury intrusion porosimetry measurements of Al/Ce/Zr core C materials having different alumina contents.

The compositions of the three different materials were checked by ICP (Table I). The pore volume is increasing with increasing alumina content between 0.23 and 0.83 ml/g, with the pore radius distribution curves (FIG. 2) showing pronounced maxima in the range between 80 and 130 Å.

Al/Ce/Zr Core D Preparation:

This Al/Ce/Zr core material was prepared following the same steps of Example 1 from WO 2012/088373 A2.

Firstly a $NaAlO_2$ basic solution having a pH of 13 was placed in a flask under stirring and heated at 48° C. To this solution was added $(NH_4)_2Ce(NO_3)_6$, $ZrO(NO_3)_2$, $Nd(NO_3)_3$ and $La(NO_3)_3$ dropwise and after that a $HNO_3$ solution was added to the mixture until reaching pH 8.5. A precipitate formed and the aqueous slurry was stirred 1 h at 48° C. Then the aqueous slurry was filtered and the filter residue obtained was washed with ammonia water of pH 9.5-10. After washing, the filter cake was resuspended in deionized water with PEG-200 solution (1 L water: 8.3 ml PEG-200 ratio) using an external stirrer (Ultraturrax) for 30 minutes, then spray dried and the resulting powder was calcined at 700° C. for 5 h to obtain the fresh Al/Ce/Zr core material.

The composition of this Al/Ce/Zr core material checked by ICP was: $Al_2O_3$=72 wt. %; $La_2O_3$=2.8 wt. %; $CeO_2$=12.6 wt. %; $ZrO_2$=11.9 wt. %; $Nd_2O_3$=0.6 wt. %. The specific surface area is 157 m²/g.

TABLE I

Characterization of Al/Ce/Zr core materials before calcination.

| Designation | Composition (wt. % oxide base) | Alumina precursor phase | Crystal size measured at the (020) reflection (nm) | D-spacing of the (020) reflection (Å) |
|---|---|---|---|---|
| Core A | Al46La2 Ce23Zr26Nd3 | Boehmite | 12 | 6.11 |
| Core B | Al75.6La2.5 Ce10.9Zr10.6Nd0.5 | Boehmite | 14 | 6.11 |
| Core D acc. WO2012/ 088373 A2 | Al72La2.8 Ce12.6Zr11.9Nd0.6 | Pseudo-boehmite | <4 | 6.54 |
| Core C80 | Al80La3 Ce5Zr11Nd1 | Boehmite | 14 | 6.11 |
| Core C44 | Al44.3La1.7 Ce16.1Zr35.2Nd2.7O2 | Boehmite | 12 | 6.11 |
| Core C23 | Al23La1 Ce21.4Zr50.5Nd4.3 | Boehmite | 12 | 6.11 |

TABLE II

Characterization of calcined Al/Ce/Zr core materials by mercury intrusion porosimetry

| Designation | Pore volume (ml/g) | Pore radius (Å) |
|---|---|---|
| Core A | 0.57 | 98 |
| Core B | 0.83 | 128 |
| Core D acc. WO2012/088373 A2 | 0.35 | n.a. |
| Core C80 | 0.83 | 98 |
| Core C44 | 0.45 | 105 |
| Core C23 | 0.23 | 86 |

TABLE III $I_{\gamma-Al2O3}/I_{CZ}$ ratio comparison of Al/Ce/Zr core B and core D after 700° C.-5 h calcination.

| Designation | $Al_2O_3$ wt. % | Intensity γ-$Al_2O_3$ reflection at 2θ ≈ 67° (from FIG. 4) | Intensity CZ reflection at 2θ ≈ 29° (from FIG. 4) | $I_{\gamma-Al2O3}/I_{CZ}$ ratio*¹ | Normalized $I_{\gamma-Al2O3}/I_{CZ}$ ratio*² |
|---|---|---|---|---|---|
| Core B | 75.6 | 0.8 | 1 | 0.80 | 1.06 |
| Core D acc. WO2012/ 088373 A2 | 72 | 0.56 | 1 | 0.56 | 0.78 |

*¹$I_{\gamma-Al2O3}/I_{CZ}$ ratio: relative intensities of γ-$Al_2O_3$ reflection at 2θ ≈ 67° with regard to the Ce/Zr solid solution reflection at 2θ ≈ 29°.
*²Normalized $I_{\gamma-Al2O3}/I_{CZ}$ ratio: [($I_{\gamma-Al2O3}/I_{CZ}$)/($Al_2O_3$ weight %)]*100

Table I summarizes the composition, the alumina precursor phase, the crystal size of the alumina precursor measured at the (020) reflection and a (020) D-value of the (020) reflection of the different Al/Ce/Zr core materials before calcination.

Table II summarizes the pore volume and pore radius of the different calcined Al/Ce/Zr core materials.

In order to further evidence the differences in crystallinity of Al/Ce/Zr cores provided herein and the Al/Ce/Zr core D according to WO 2012/088373 A2, the relative intensities of gamma-alumina reflection at 2θ≈67° with regard to the Ce/Zr solid solution reflection at 2θ≈29° after calcination of the cores at 700° C. for 5 hours have been analysed. Table III includes this $I_{\gamma-Al2O3}/I_{CZ}$ ratio and the normalization of this ratio by the $Al_2O_3$ weight % of the Al/Ce/Zr core, as the intensity of these reflections depend on the $Al_2O_3$ content of the Al/Ce/Zr material.

From Table III a higher $I_{\gamma-Al2O3}/I_{CZ}$ normalized ratio for the Al/Ce/Zr core B with regard to the Al/Ce/Zr core D is shown, being this normalized $I_{\gamma-Al2O3}/I_{CZ}$ ratio larger than 1 for the Al/Ce/Zr cores according to the present invention.

Figure 3:
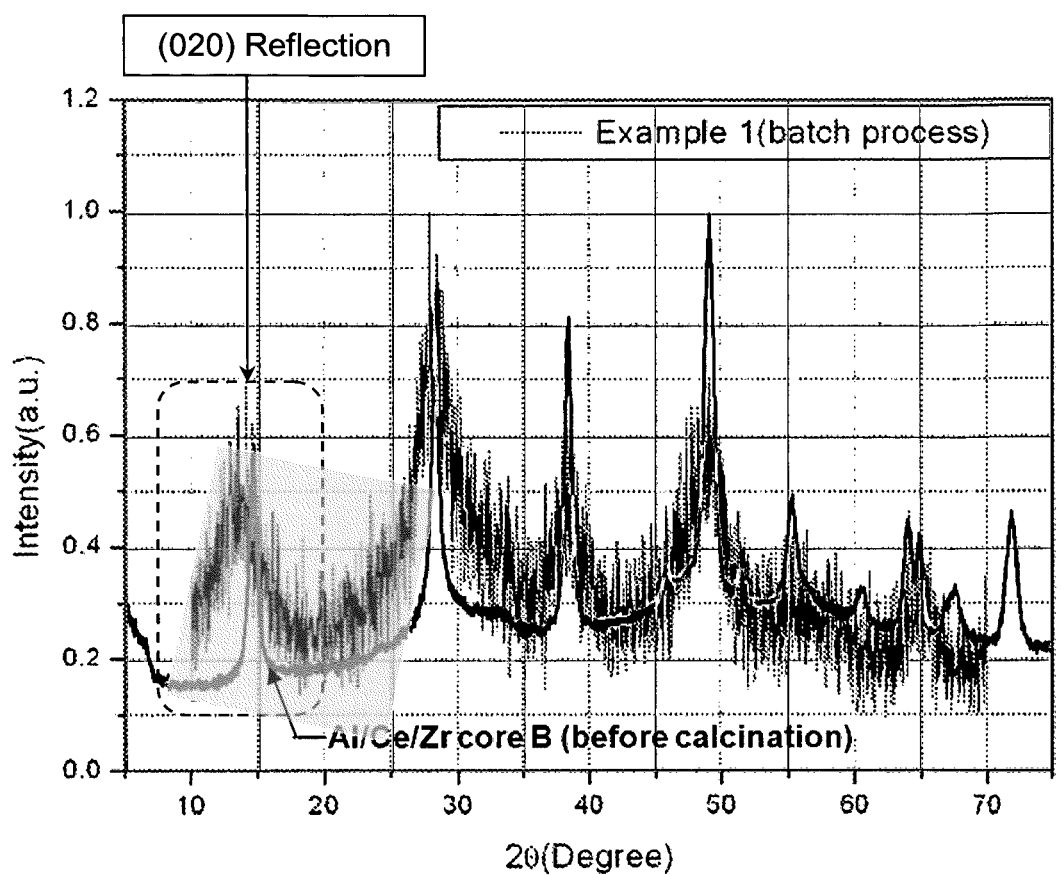
FIG. 3 is an XRD comparing the crystallinity of the Al/Ce/Zr core B of the present invention with that of core D of WO2012/088373 before calcination.
Figure 4:
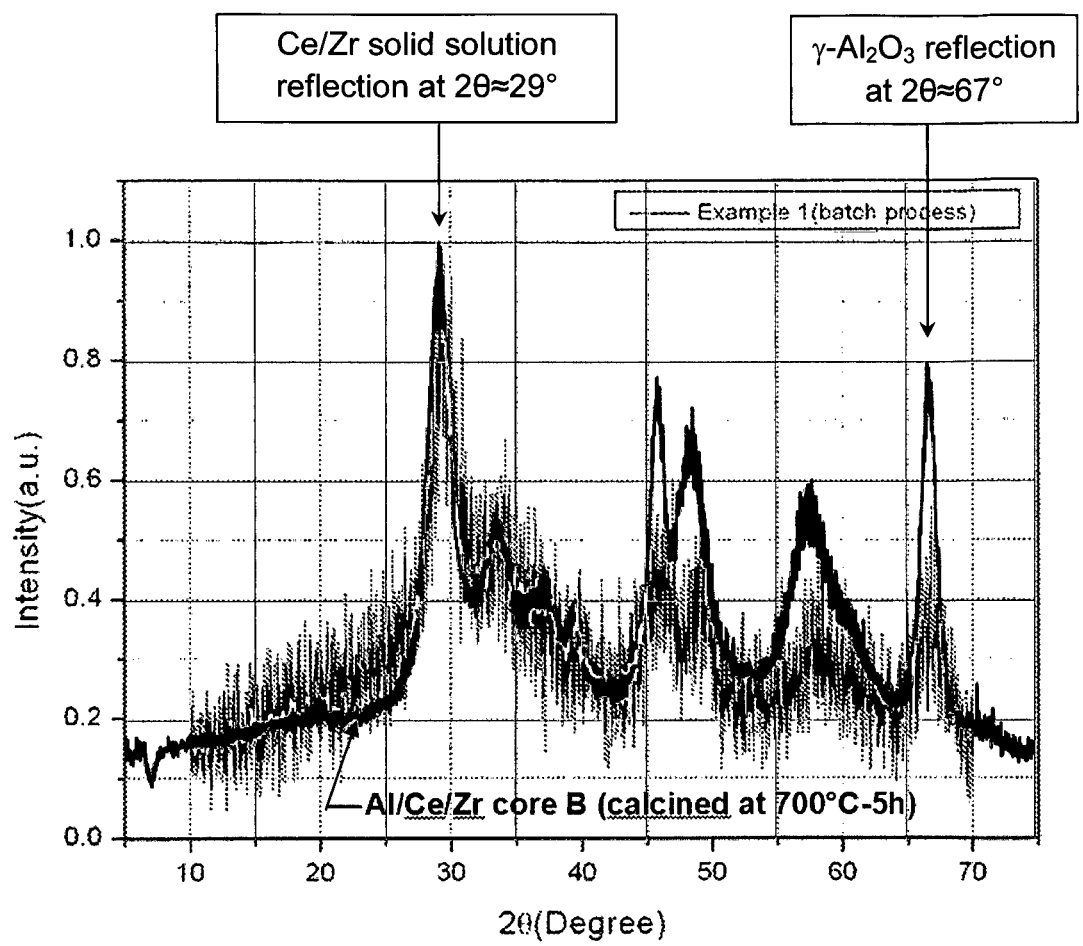
FIG. 4 is an XRD comparing the crystallinity of the Al/Ce/Zr core B of the present invention with that of core D of WO2012/088373 after calcination at 700° C. for 5 hours.

Furthermore, the crystallinity of Al/Ce/Zr Core B was compared with the crystallinity of Al/Ce/Zr core D as per FIGS. 3 and 4. From the FIG. 3 it is clear that the pseudo-boehmite core D shows a poor crystallinity when compared with core B which has a well crystallized boehmite structure before calcination.

After calcination at 700° C. for 5 hours the superior crystallinity of Al/Ce/Zr core B compared with Core D is exhibited from the more intensive and pronounced gamma-alumina reflection at 2θ≈67° (FIG. 4). As a result of these differences in crystallinity, the Al/Ce/Zr Core B was able to be better coated than Core D.

TABLE IV

| Example # | Al/Ce/Zr core | metal oxide coated | wt. % of coated metal oxide | metal oxide precursor |
|---|---|---|---|---|
| 1 | A | $CeO_2$ | 4, 8, 17, 27 | Ce-nitrate |
| 2 | A | $CeO_2$ | 17 | Ce-acetate |
| 3 | A | $CeO_2$ | 4, 8, 16 | Ce-citrate complex |
| 4 | A | $CeO_2$ | 1, 4, 10, 17 | Ce-EDTA complex |
| 5 | A | $CeO_2$ | 46 | Ce-acetate |
| 6 | A | $ZrO_2$ | 9 | Zr-acetate |
| 7 | A | $(CeZrNd)O_2$ | 39 | Ce, Zr, Nd—acetates |
| 8 | B | $CeO_2$ | 17 | $(NH_4)_2Ce(NO_3)_6$ |
| comp. Ex. 1 | D | $CeO_2$ | 17 | $(NH_4)_2Ce(NO_3)_6$ |

Example 1—Incipient Wetness Impregnation (IWI) Using $Ce(NO_3)_3$

An aqueous solution of $Ce(NO_3)_3$ was added under continuous mixing to the Al/Ce/Zr core A material until the point of incipient wetness was reached, i.e. the pore volume of the Al/Ce/Zr core material is completely filled with solution.

Four samples were prepared following this procedure having 4, 8, 17 and 27 wt. % $CeO_2$ impregnated onto the Al/Ce/Zr core material (as verified by ICP analysis) by adjusting the concentration of the $Ce(NO_3)_3$ solution. All samples were dried at 120° C. overnight and calcined at 550° C. for 3 h.

La-leaching suppression (%) results are included in Table V hereunder:

TABLE V

| Sample | La-leaching suppression (%) |
|---|---|
| 4 wt. % $CeO_2$/Al/Ce/Zr core A | 23 |
| 8 wt. % $CeO_2$/Al/Ce/Zr core A | 26 |
| 17 wt. % $CeO_2$/Al/Ce/Zr core A | 37 |
| 27 wt. % $CeO_2$/Al/Ce/Zr core A | 54 |

The results in Table V shows that a progressive increase of the La-leaching suppression (%) with increasing amount of impregnated $CeO_2$ on the surface of the Al/Ce/Zr core is observed. This La-leaching suppression is used as a prove for the existence of an uniform $CeO_2$ surface layer on the Al/Ce/Zr core material which reduces the Al and La contact to aqueous phase.

Example 2—Equilibrium Deposition Filtration (EDF) Using Ce-Acetate

The Al/Ce/Zr core A material was re-suspended in the required volume of a Ce-acetate aqueous solution with a concentration of 1 wt. % $CeO_2$. To the resulting suspension under stirring was added ammonia solution to reach pH 9.0. Then the mixture was heated at 50° C. for 3 h under stirring. After that the sample was filtered, dried at 120° C. overnight and calcined at 550° C. for 3 h. The ICP analysis of the final material indicated a $CeO_2$ incorporation of 17 wt. % onto the Al/Ce/Zr core material.

The above described Al/Ce/Zr core A coated with a 17 wt. % $CeO_2$ shows a La-leaching suppression result of 81%, indicating an effective coating.

Example 3—Wet Impregnation (WI) Using a Ce-Citrate Complex

The ammonium citrate dibasic salt was dissolved in deionized water and the pH was adjusted to 10 with the addition of ammonia solution. To this citrate solution was incorporated drop-wise a Ce-acetate solution using a molar ratio citrate:$CeO_2$ of 1:1 in order to prepare the Ce-citrate complex. The complex was aged for 2 h at room temperature. Then, the Al/Ce/Zr core A material was added to this solution and the obtained suspension was aged for 24 h at room temperature with constant stirring. After that the suspension was dried in a rotary evaporator by applying temperature and vacuum and the dry powder was finally calcined at 550° C. for 3 h.

Three samples were prepared following this procedure having 4, 8 and 16 wt. % $CeO_2$ impregnated onto the Al/Ce/Zr core material (as verified by ICP analysis).

La-leaching suppression (%) results are included in Table VI hereunder:

TABLE VI

| Sample | La-leaching suppression (%) |
|---|---|
| 4 wt. % $CeO_2$/Al/Ce/Zr core A | 31 |
| 8 wt. % $CeO_2$/Al/Ce/Zr core A | 36 |
| 16 wt. % $CeO_2$/Al/Ce/Zr core A | 52 |

The results in Table VI show that a progressive increase of the La-leaching suppression (%) with increasing amount of impregnated $CeO_2$ on the surface of the Al/Ce/Zr core is observed.

Example 4—Wet Impregnation (WI) Using a Ce-EDTA Complex

Firstly the ethylenediaminetetraacetic acid (EDTA) was dissolved in deionized water after adjusting the pH at 10 with ammonia solution. To this EDTA solution was incorporated drop-wise a Ce-acetate solution using a molar ratio EDTA:$CeO_2$ of 1:1 in order to prepare the Ce-EDTA complex. The complex was aged for 2 h at room temperature.

Then, the Al/Ce/Zr core A material was added to this solution and the obtained suspension was aged for 24 h at room temperature with constant stirring. After that the suspension was dried in a rotary evaporator by applying temperature and vacuum and the dry powder was finally calcined at 550° C. for 3 h.

Four samples were prepared following this procedure having 1, 4, 10 and 17 wt. % $CeO_2$ impregnated onto the Al/Ce/Zr core material (as verified by ICP analysis).

La-leaching suppression (%) results are included in Table VII hereunder:

TABLE VII

| Sample | La-leaching suppression (%) |
|---|---|
| 1 wt. % $CeO_2$/Al/Ce/Zr core A | 19 |
| 4 wt. % $CeO_2$/Al/Ce/Zr core A | 35 |
| 10 wt. % $CeO_2$/Al/Ce/Zr core A | 38 |
| 17 wt. % $CeO_2$/Al/Ce/Zr core A | 55 |

The results in Table VII show that a progressive increase of the La-leaching suppression (%) with increasing amount of impregnated $CeO_2$ on the surface of the Al/Ce/Zr core is observed.

Example 5—Wet Impregnation (WI) in Volume Excess Using Ce-Acetate

The Al/Ce/Zr core A material was re-suspended in the required volume of a Ce-acetate aqueous solution with a concentration of 6.4 wt. % $CeO_2$ in order to finally incorporate 50 wt. % of $CeO_2$. This suspension was dried in a rotary evaporator by applying temperature and vacuum and the dry powder was finally calcined at 550° C. for 3 h. The ICP analysis of the final material verified an actual $CeO_2$ incorporation onto the Al/Ce/Zr core material of 46 wt. %.

The above described Al/Ce/Zr core A coated with a 46 wt. % $CeO_2$ shows a La-leaching suppression result of 77%, indicating an effective coating.

Example 6—Equilibrium Deposition Filtration (EDF) Using Zr-Acetate

The Al/Ce/Zr core A material was re-suspended in the required volume of a Zr-acetate aqueous solution with a concentration of 1 wt. % $ZrO_2$ in order to incorporate a total amount of 10 wt. % of $ZrO_2$ onto the Al/Ce/Zr core material. To the resulting suspension under stirring was added ammonia solution to reach pH 9.0. Then the mixture was heated at 50° C. for 3 h under stirring. After that the sample was filtered, dried at 120° C. overnight and calcined at 550° C. for 3 h. The ICP analysis of the final material indicated a $ZrO_2$ incorporation of 9 wt. % onto the Al/Ce/Zr core material.

The above described Al/Ce/Zr core A coated with a 9 wt. % $ZrO_2$ shows a La-leaching suppression result of 46%, indicating an effective coating.

Example 7—Equilibrium Deposition Filtration (EDF) Using Ce-, Zr-, Nd-Acetate

The Al/Ce/Zr core A material was re-suspended in the required volume of an aqueous solution containing Ce-acetate, Zr-acetate and Nd-acetate with a total concentration of 1 wt. % $M_xO_y$ ($M_xO_y$=$CeO_2$+$ZrO_2$+$Nd_2O_3$) in order to incorporate a total amount of 40 wt. % of mixed oxide onto the Al/Ce/Zr core material. To the resulting suspension under stirring was added ammonia solution to reach pH 9.0. Then the mixture was heated at 50° C. for 3 h under stirring. After that the sample was filtered, dried at 120° C. overnight and calcined at 550° C. for 3 h. The ICP analysis of the final material indicated a mixed oxide incorporation of 39 wt. % onto the Al/Ce/Zr core material.

The above described Al/Ce/Zr core A coated with a 39 wt. % mixed oxide shows a La-leaching suppression result of 68%, indicating an effective coating.

Example 8—Impregnation Using $(NH_4)_2Ce(NO_3)_6$ of Core B 20 g of Al/Ce/Zr Core B material is impregnated in two steps by adding an aqueous solution of $(NH_4)_2Ce(NO_3)_6$. For each impregnation step a solution consisting of 6.9 g $(NH_4)_2Ce(NO_3)_6$ salt in water having a total volume of 16.6 ml was used, in order to incorporate around 10 wt. % of $CeO_2$ in each impregnation step. In between the impregnation steps the powder was dried at 120° C. for 2 h. After the second impregnation the sample was dried at 120° C. for 16 h and calcined at 550° C. for 3 h.

The ICP analysis confirmed a total amount of 17 wt. % of $CeO_2$ incorporated on the Al/Ce/Zr core B material after the whole impregnation process.

Comparative Example 1—Impregnation Using $(NH_4)_2Ce(NO_3)_6$ of Core D 20 g of the Al/Ce/Zr core D material prepared according to WO2012/088373 A2 is impregnated in two steps by adding an aqueous solution of $(NH_4)_2Ce(NO_3)_6$. For each impregnation step a solution consisting of 6.9 g $(NH_4)_2Ce(NO_3)_6$ salt in water having a total volume of 16.6 ml was used, in order to incorporate around 10 wt. % of $CeO_2$ in each impregnation step. In between the impregnation steps the powder was dried at 120° C. for 2 h. After the second impregnation the sample was dried at 120° C. for 16 h and calcined at 550° C. for 3 h.

The ICP analysis confirmed a total amount of 17 wt. % of $CeO_2$ incorporated on the Al/Ce/Zr core D material after the whole impregnation process.

La-leaching suppression (%) results are included in Table VIII hereunder:

TABLE VIII

| Sample | La-leaching suppression (%) |
|---|---|
| Example 8 17 wt. % $CeO_2$/Al/Ce/Zr core B | 38 |
| Comparative Example 1 17 wt. % $CeO_2$/Al/Ce/Zr core D | 11 |

The significantly higher La-leaching suppression value of the coated Al/Ce/Zr composite made in Example 8 as compared to the material made in the Comparative Example 1 indicates an enhanced effectiveness of the cerium oxide surface layer of the material of the present invention. As the impregnation procedure, cerium oxide precursor and the amount of coated metal oxide that are applied in Example 8 and Comparative Example 1 are equal, the findings of Table VIII prove that a high effectiveness of the metal oxide coating can only be achieved by applying an appropriate Al/Ce/Zr core material having a specific alumina precursor having a specific crystallite size, specific pore volume and pore radius distribution.

TABLE IX

|  | Example 8 | | Comparative Example 1 | |
| --- | --- | --- | --- | --- |
|  | BET (m²/g) | Pore volume (ml/g) | BET (m²/g) | Pore volume (ml/g) |
| 4 h 1000° C. | 72 | 0.53 | 51 | 0.19 |
| 4 h 1100° C. | 57 | 0.45 | 29 | 0.17 |
| 4 h 1200° C. | 36 | 0.32 | 15 | 0.14 |

Table IX shows superior thermal stability of the coated Al/Ce/Zr composites of the present invention compared to prior art material. This is in addition to the enhanced effectiveness of the cerium oxide coating a beneficial property achieved by applying an appropriate Al/Ce/Zr core material having a specific alumina precursor having a specific crystallite size, a specific pore volume and pore radius distribution.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

The invention claimed is:

1. A method of producing a coated Al/Ce/Zr composite, the method comprising the steps of:
   i) preparing a non-calcined Al/Ce/Zr core, the non-calcined core being characterized by an alumina precursor of boehmite crystal structure having a crystallite size measured at the (020) reflection between 4 and 40 nm and a D-value of the (020) reflection of below 6.5 Å;
   ii) calcining the non-calcined Al/Ce/Zr core to form a calcined Al/Ce/Zr core; the calcined Al/Ce/Zr core consisting of two phases, an La stabilized $Al_2O_3$ phase and a Ce/Zr/$Re_2O_3$ mixed oxide phase, both phases forming a homogeneous mixture, the calcined Al/Ce/Zr core being further characterized by having a pore volume above 0.2 ml/g, and a maximum of the pore size distribution between 50 and 200 Å;
   iii) impregnating the calcined Al/Ce/Zr core with a metal oxide precursor such that the metal oxide precursor forms a coating on the core to form an impregnated core; and
   iv) calcining the impregnated core such that a metal oxide coating is applied to the core to form the coated Al/Ce/Zr composite, wherein the metal oxide coating forms between 1 to 50 wt. % after calcination of the coated Al/Ce/Zr composite.

2. The method of claim 1, wherein the boehmite is further characterized by a D-value of the (020) reflection of from 6.05 Å to 6.20 Å.

3. The method of claim 1, wherein the metal oxide precursor comprises precursors for the oxides of alkaline earth elements, transition metals or rare earth metals.

4. The method of claim 1, wherein the metal oxide precursor comprises one or more members selected from the group consisting of precursors of $CeO_2$, $ZrO_2$, mixed oxides of Ceria/Zirconia, and one or more rare earth metal oxide different from Ceria.

5. The method of claim 4 wherein the $CeO_2$ precursors comprise one or more member selected from the group consisting of Ce-nitrate, $(NH_4)_2Ce(NO_3)_6$, Ce-actetate, Ce-carbonate, Ce-sulfate, Ce-hydroxide, Ce-oxalate, Ce-acetylacetonate, Ce-Citrate-complex and Ce-EDTA-complex.

6. The method of claim 1, wherein the metal oxide precursor consists of precursors for $CeO_2$.

7. The method of claim 1, wherein the calcined Al/Ce/Zr core is characterized by an intensity ratio between the characteristic reflection of gamma-alumina at $2\theta \approx 67°$ and the characteristic reflection of Ce/Zr solid solution at $2\theta \approx 29°$, normalized by the $Al_2O_3$ weight % of equal to or larger than 1.

8. The method of claim 1, wherein calcination of the Al/Ce/Zr core is carried out at a temperature of 400° C. to 900° C.

9. The method of claim 1, wherein calcination after impregnation is carried out at a temperature of 400° C. to 900° C.

10. The method of claim 1, wherein the calcination of the Al/Ce/Zr core is carried out at a temperature of 500° C. to 850° C., and the calcination after impregnation is carried out at a temperature of 500° C. to 700° C.

* * * * *